United States Patent
Maine, Jr. et al.

(10) Patent No.: US 7,721,877 B2
(45) Date of Patent: May 25, 2010

(54) QUICK SPLICE CONVEYOR BELT SYSTEM AND METHOD THEREFOR

(75) Inventors: Robert E. Maine, Jr., Salisbury, MD (US); George Howard Messick, Jr., East New Market, MD (US); Charles Hennigar, East New Market, MD (US); Chetwyn Jones, Cambridge, MD (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

(21) Appl. No.: 12/326,950

(22) Filed: Dec. 3, 2008

(65) Prior Publication Data

US 2009/0145732 A1 Jun. 11, 2009

Related U.S. Application Data

(60) Provisional application No. 60/996,733, filed on Dec. 3, 2007.

(51) Int. Cl.
*B65G 15/54* (2006.01)

(52) U.S. Cl. ...................................... 198/848; 198/850

(58) Field of Classification Search .................. 198/778, 198/848, 850, 853
See application file for complete search history.

(56) References Cited

U.S. PATENT DOCUMENTS

| | | | | |
|---|---|---|---|---|
| 2,619,306 | A | * 11/1952 | Van Lake | .................... 198/850 |
| 3,176,358 | A | 4/1965 | Leflon | |
| 4,754,871 | A | * 7/1988 | Gustafson | ................... 198/848 |
| 4,944,716 | A | 7/1990 | Graff | |
| 4,957,597 | A | * 9/1990 | Irwin | ......................... 198/848 |
| 5,954,187 | A | 9/1999 | Hager | |
| 6,102,196 | A | 8/2000 | Domit, Jr. | |
| 6,202,833 | B1 | * 3/2001 | Greer | ......................... 198/848 |
| 6,325,205 | B1 | * 12/2001 | Heyde | ......................... 198/848 |
| 6,354,432 | B1 | * 3/2002 | Maine et al. | ................. 198/850 |
| 6,371,284 | B1 | * 4/2002 | Pasch | ......................... 198/848 |

* cited by examiner

*Primary Examiner*—James R Bidwell
(74) *Attorney, Agent, or Firm*—Buchanan Ingersoll & Rooney PC

(57) ABSTRACT

A conveyor belt system includes a splice rod having a j-shaped hook on each end thereof and a plurality of links for receiving the splice rod therethrough. The links further include a specially modified link end for securing the rods.

14 Claims, 6 Drawing Sheets

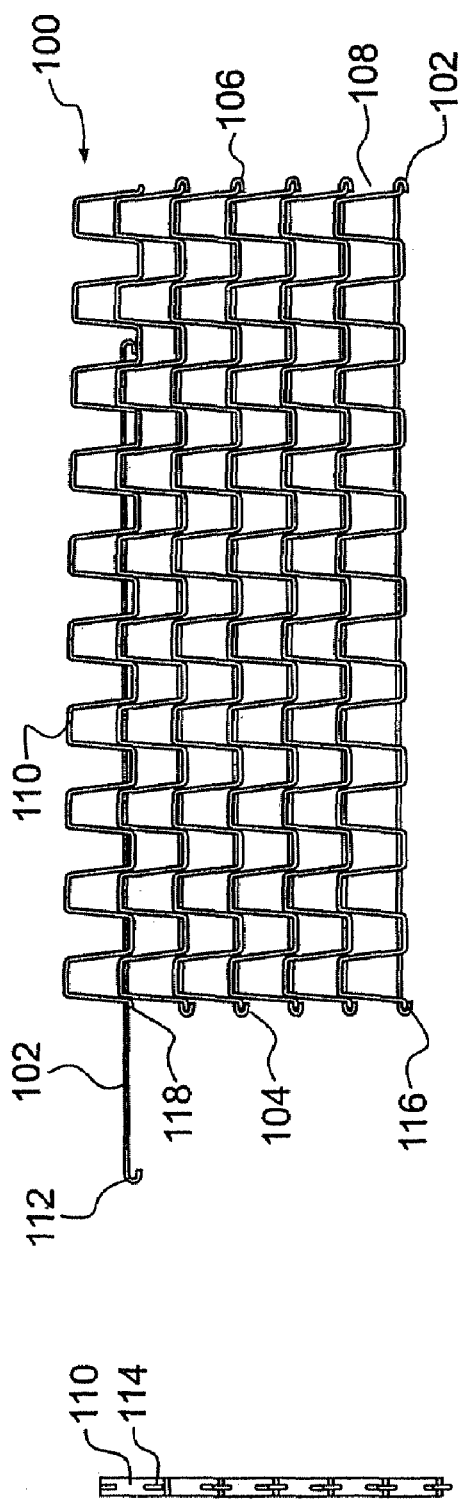
FIG. 3
FIG. 4
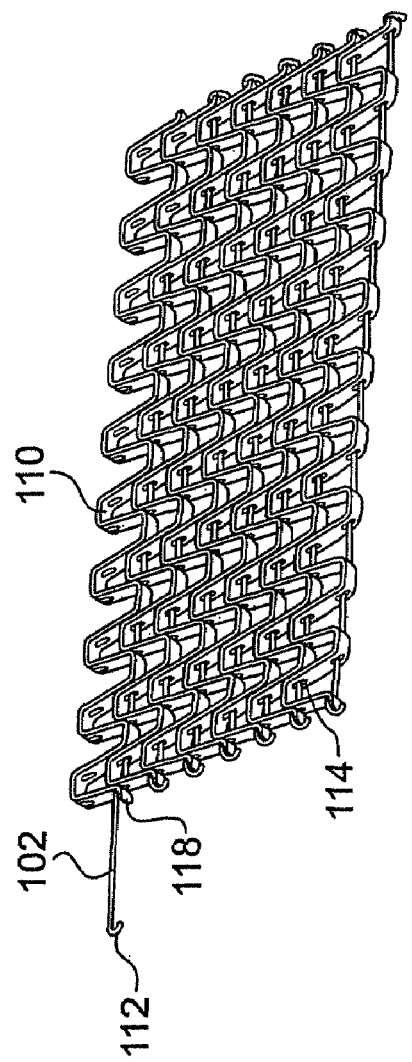
FIG. 5

QUICK SPLICE CONVEYOR BELT SYSTEM AND METHOD THEREFOR

CROSS-REFERENCE TO RELATED APPLICATION

The present application claims priority under 35 U.S.C. 119(e) to provisional application Ser. No. 60/996,733, filed Dec. 3, 2007, the entire contents of which are hereby incorporated by reference.

FIELD OF THE INVENTION

The present invention is directed to a conveyor belt, more particularly to a conveyor belt having a preformed splice rod, and still more particularly, to a conveyor belt system having specially sized openings in the conveyor belt components to receive the splice rod therethrough.

BACKGROUND OF THE INVENTION

One of the most commonly used types of conveyor belts for carrying diverse products along both straight and horizontally curved paths is a grid conveyor belt. Examples of conventional grid conveyor belts are the Cam-Grid® and the heavy duty Cam-Grid® conveyor belts available from Cambridge, Inc., the assignee of the present invention. A grid conveyor belt, as shown generally in U.S. Pat. No. 6,354,432, the entire contents of which are hereby incorporated by reference, includes a plurality of spaced transverse rods slidably interconnected by at least two rows of U-shaped connecting links, i.e., the tension bearing members, disposed respectively along the inner and outer edges of the rods. The terminal ends of the transverse rods are formed into enlarged heads or button heads which retain the links on the rods and welds are then provided to secure the link to the button head and to the rod, thereby preventing rotational movement of the links on the transverse rods. The connecting links are disposed in a nested relationship relative to one another with slots being provided in the links in order to slidably receive the transverse rods.

Grid conveyor belts of this type have met with overwhelming market approval because of their ability to travel in straight line conveyor paths as well as in curved conveyor paths, thus making grid conveyor belts ideal for use on spiral cage conveyors. However, when the belt is in need of repair due to breakage or maintenance, the presence of the button head ends and welded ends requires the use of special tools such as a grinder and bolt cutter and welding in order to part an endless belt or to reconnect or splice two separate ends of a belt. In addition, special threaded connector rods with end nuts have to be used to replace the rods with the button head ends when performing repair/maintenance in the field.

Flat wire conveyor belts have also been in the market for many years, as shown for example in U.S. Pat. No. 2,619,306, the contents of which are hereby incorporated by reference. Flat wire conveyor belts are generally low maintenance and when positively driven with sprockets have little to no lateral shifting. With reference to FIG. 1, there is disclosed a flat wire conveyor belt 10 comprising a plurality of pickets 12, sometimes also referred to as wickets, and interconnecting rods 14 about which the pickets hinge. The pickets of the belt define the tension bearing members and support the product to be conveyed and the rods are utilized to hold the components of belt together. This type of flat wire conveyor belts also utilize upset rod ends 16, i.e., button head shaped ends, for rod retention. The compression between the pickets keep them from moving inward of the button head ends, while the button head ends prevent the pickets from moving outwardly. Flat wire conveyor belts of this type can also be used in both straight and turn applications. A second type of flat wire conveyor belt 10', as shown in FIG. 2, utilizes mechanically clinched rod ends 16' for rod retention. These type of belts are used only in straight run applications.

Flat wire conveyor belts have similarly met with long term market approval. However, when the belt is in need of repair due to breakage or maintenance, the presence of the button head or clinched rod ends requires the use of special tools such as a grinder or bolt cutters and welding or special hand tools in order to part an endless belt or to reconnect or splice two separate ends of a belt. In addition, special threaded or partially clinched connector rods with end nuts have to be used to replace the rods when performing repair/maintenance in the field.

While market trends are dictating that improvements be made to reduce conveyor system down time, employers are finding that maintenance resources are decreasing in both quantity and skill base. Accordingly, there exists a need in the marketplace for a flat wire conveyor belt having a connector rod that can quickly and easily be used to splice together and repair a conveyor belt with a minimal use of tools or skill.

SUMMARY OF THE INVENTION

These and other objects are met by a conveyor belt system including a splice rod having a j-shaped hook on each end thereof and a plurality of links for receiving the splice rod therethrough. The links further include a specially modified link end for securing the rods.

A further aspect of the invention is directed to a conveyor belt comprising a plurality of spaced tractive rods; a plurality of rows of flat wire wickets transversely disposed with respect to a direction of travel and interconnecting said plurality of spaced tractive rods, wherein at least one of said rows of flat wire wickets includes an outer edge link on each end thereof, said outer edge link including a projecting tab on an outer side thereof; and wherein at least one of said plurality of rods includes a hooked shaped end on each end thereof, at least one hooked shaped end of said at least one rod engaging the projecting tab on one said outer edge link.

Still further, the present invention encompasses a method of manufacturing a conveyor belt. The method comprises providing a plurality of transverse rods including a hooked shaped end on each end thereof; providing a plurality of wickets or links having a first pair of openings extending laterally therethrough and a second pair of openings extending therethrough, said outermost edge wickets or links including a projecting extension; and arranging the transverse rods through the first and second pair of openings so as to pivotally interconnect the transverse rods in a longitudinally spaced arrangement; wherein said hooked shaped ends of said rods engage the projecting extensions on said outermost wickets or links.

BRIEF DESCRIPTION OF THE DRAWING FIGURES

These and other objects, features, and advantages of the present invention will become more readily apparent to those skilled in the art upon reading the following detailed description, in conjunction with the appended drawings in which:

FIG. 3 is a top elevational view of a flat wire conveyor belt according to a preferred embodiment of the present invention.

FIG. 4 is a side elevational view of the flat wire conveyor belt shown in FIG. 3.

FIG. 5 is a perspective view of the flat wire conveyor belt shown in FIG. 3.

DETAILED DESCRIPTION OF THE PREFERRED EMBODIMENTS

Figure 1:
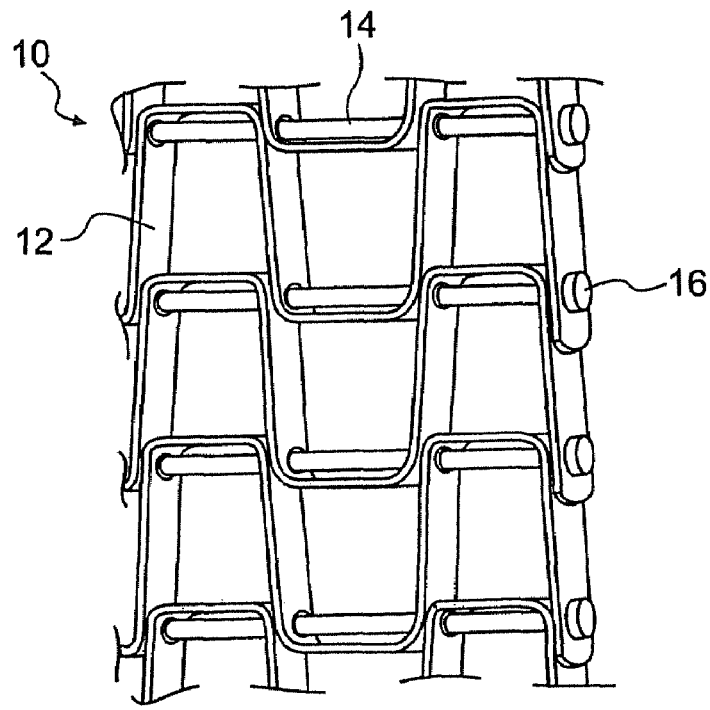
FIG. 1 is a perspective view of a segment of a conventional flat wire conveyor belt.
Figure 2:
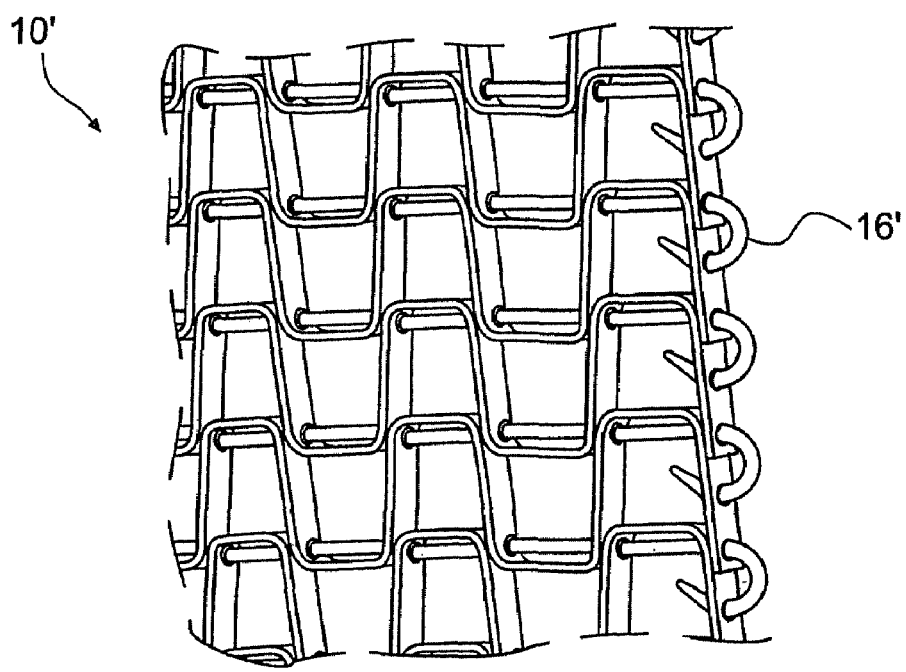
FIG. 2 is a perspective view of a segment of a second type of conventional flat wire conveyor belt.

A conveyor belt in accordance with the present invention is shown generally in FIG. 3 by reference numeral 100. Conveyor belt 100 preferably comprises a flat wire conveyor belt including a plurality of spaced tractive rods 102 disposed in succession and transversely with respect to a direction of travel, each rod 102 having two ends 104 and 106.

Belt 100 includes a plurality of rows of pickets 108 transversely disposed with respect to the direction of travel, and interconnecting the succession of rods 102. Each row of pickets 108 is comprised of a plurality of links 110, each link connecting a rod 108 with a following rod 108 in the succession.

In accordance with a first preferred embodiment of the present invention, as shown in FIGS. 3-7, rods 102 include a special connecting "J" rod for splicing together two ends of a conveyor belt. The rods 102 are pre-formed with a "J" shaped hook 112 on each end 104, 106. Moreover, the links 110 include openings 114 proximal each terminal end which define slots sized to allow the J-shape hook 112 on the ends 104, 106 of the rod 102 to pass freely through the pickets 108. In order to secure the connecting rods 102 after they are inserted through the pickets, the outer ends 116 of the picket are modified to form a projecting tab 118.

Figure 6:
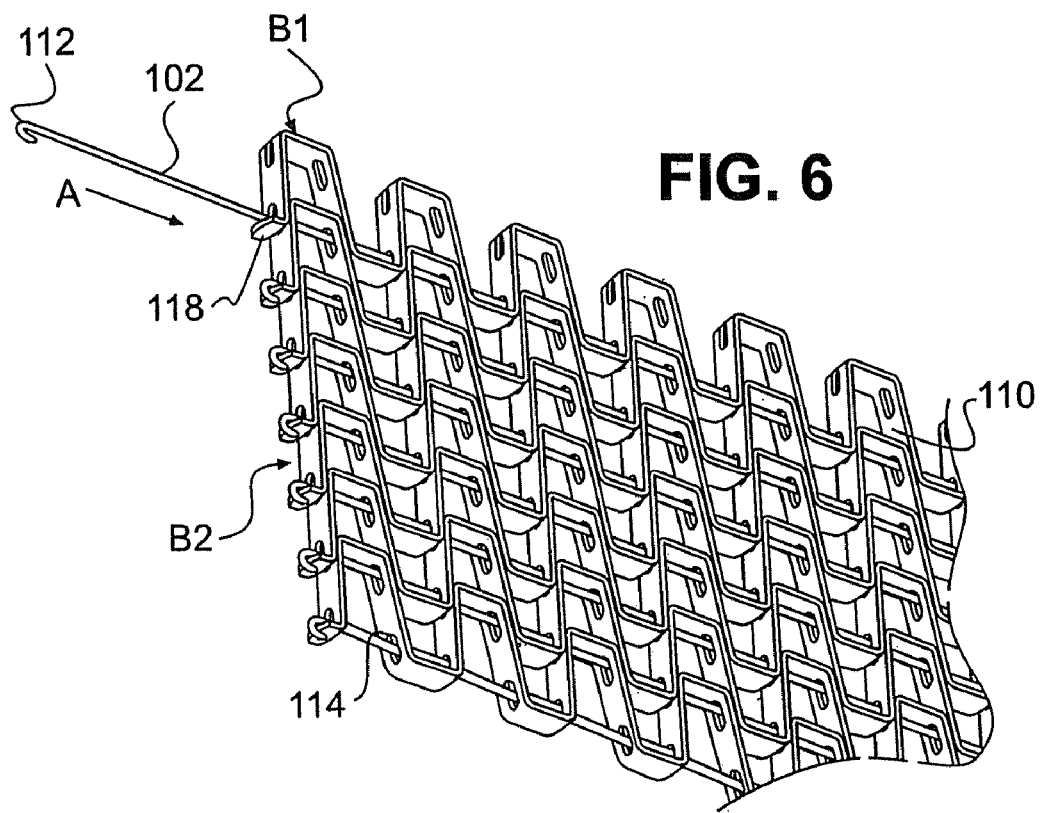
FIG. 6 is a partial enlarged perspective view of the flat wire conveyor belt shown in FIG. 5.
Figure 7:
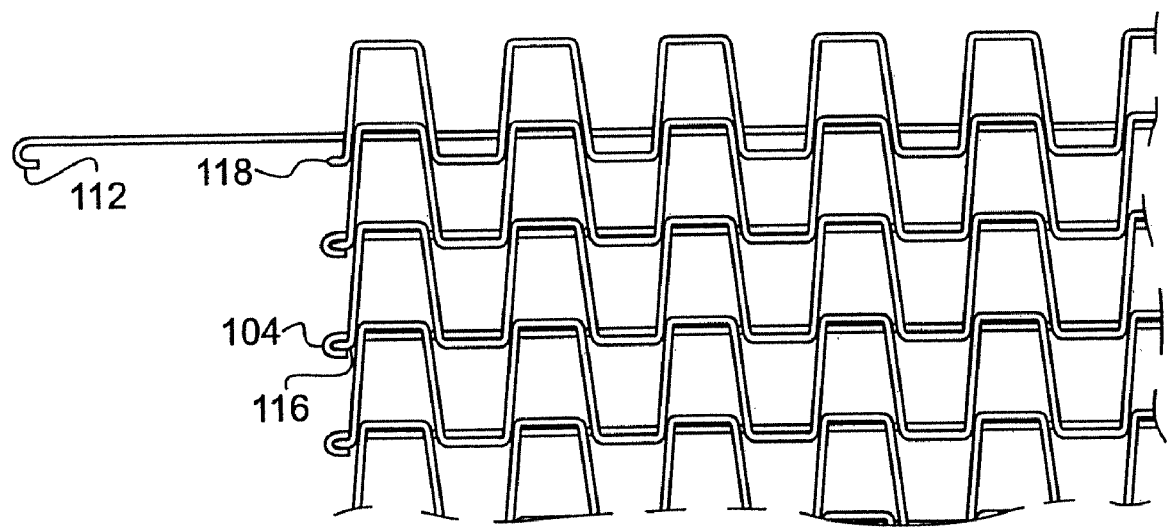
FIG. 7 is a partial enlarged elevational view of the flat wire conveyor belt shown in FIG. 3.

Referring to FIGS. 6 and 7, in order to splice together two ends of flat wire conveyor belts B1 and B2, the pickets of the belts are aligned in succession and a splice rod 102 is inserted in the direction of arrow A through the link openings 114 of the respective rows of pickets 108. When the rod 102 is disposed completely through the pickets, the j-shaped ends 104, 106 are hooked or snapped onto the projecting tabs 118 on each end 116 of the picket 108, either by hand or through the use of a simple pair of pliers. Upon connection of the j-shaped ends and the picket ends, the splice is thereby complete. When it is necessary to take a belt apart, such as to remove a damaged picket for example, this process can be easily reversed for removal of the same.

Figure 12:
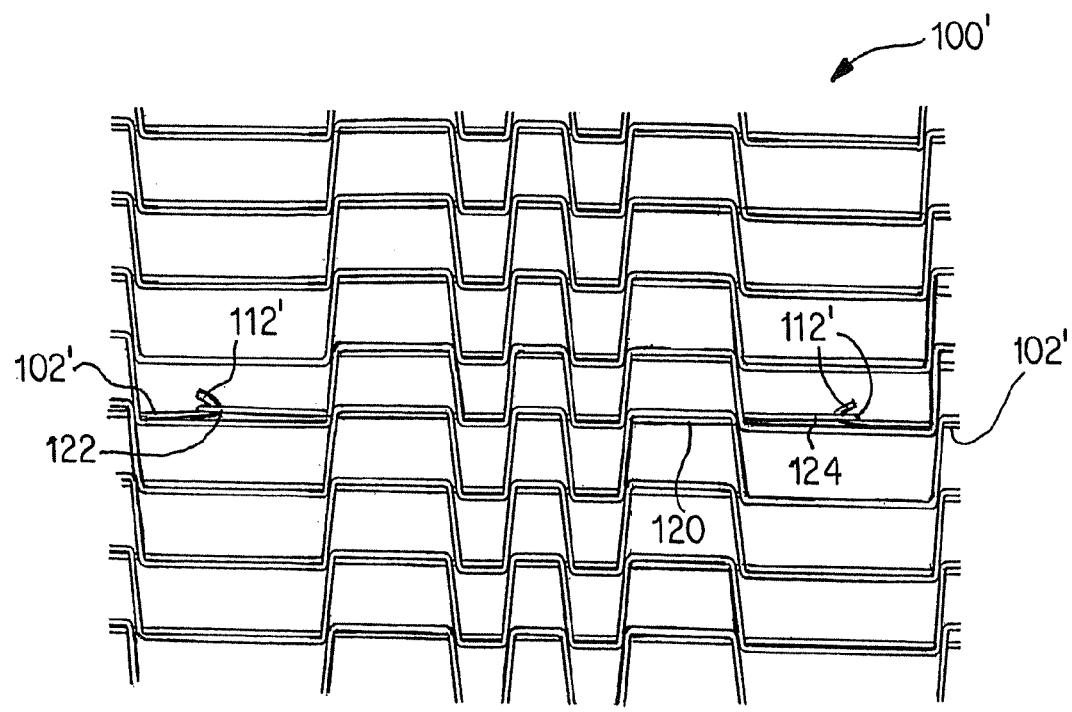
FIG. 12 is a top elevational view of a flat wire conveyor belt according to a further preferred embodiment of the present invention.
Figure 13:
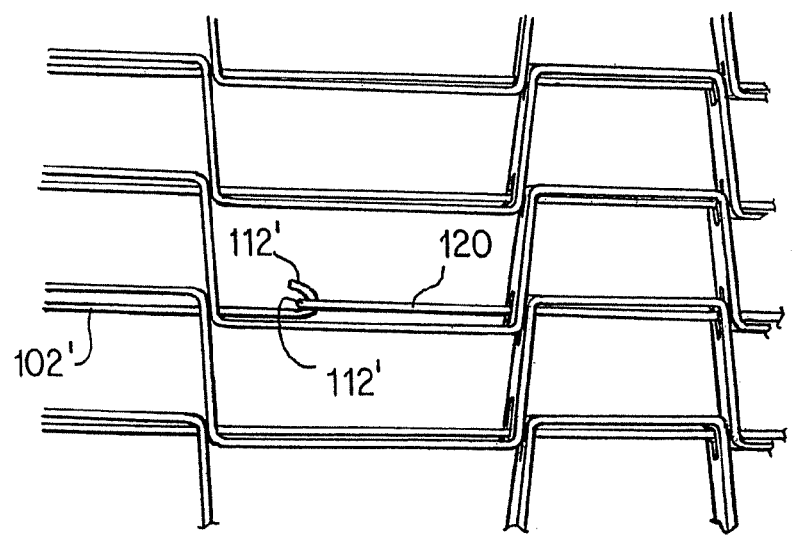
FIG. 13 is a partial top elevational view of the flat wire conveyor belt shown in FIG. 12.
Figure 14:
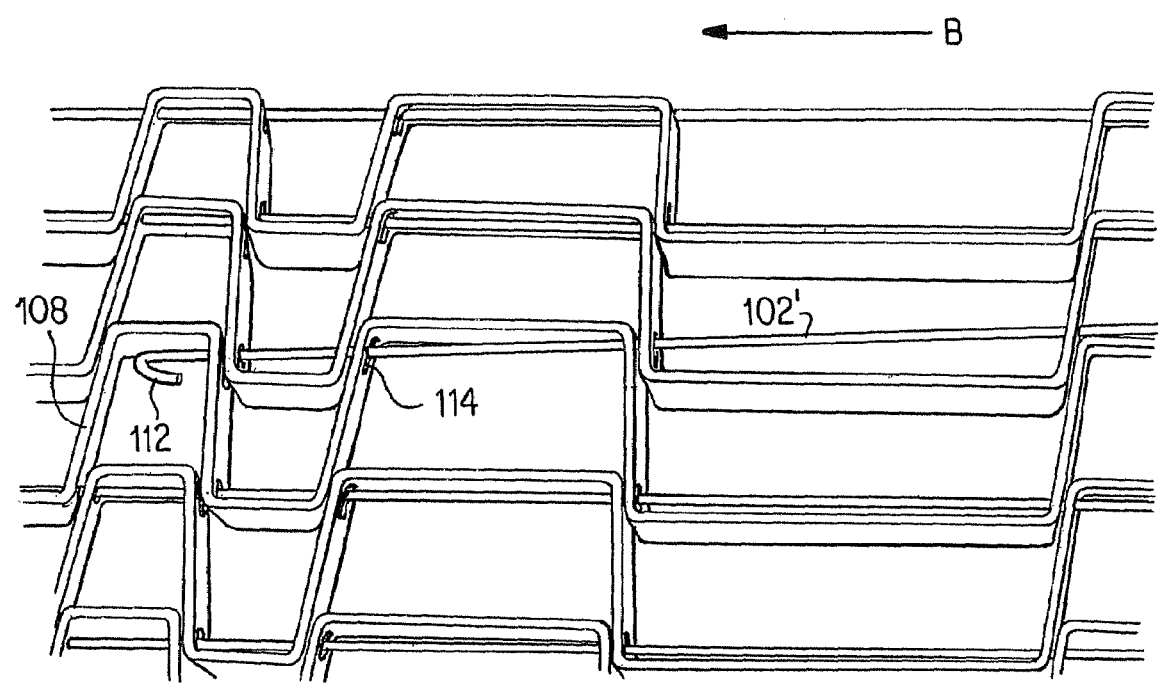
FIG. 14 is a partial perspective view of the flat wire conveyor belt shown in FIG. 12.

Their have been applications where access to the side edges of the belt has been limited or non-existent due to the required installation procedure or space constraints. Because of this need in the field, a variation of the above-described conveyor belt and splice method was developed to allow for center splicing of a conveyor belt. In accordance with a second preferred embodiment of the present invention, as shown in FIGS. 12-14, conveyor belt 100' includes two edge rods 102' including the special connecting "J" shaped hook 112' on each end and a center splice rod 120 including the special "J" shaped hook 112' on both ends 122, 124. As described above relative to belt 100, the links 110 include openings 114 proximal each terminal end which define slots sized to allow the J-shape hook 112' on the ends of the rod 102' to pass freely through the pickets 108. In order to secure the connecting rods 102' after they are inserted through the pickets, the outer ends 116 of the picket are modified to form a projecting tab 118 (FIG. 6). The edge rods 102' engage the outer ends 116 of the pickets on one end thereof and the opposite ends of the edge rods 102' connect to the opposing ends 122, 124 of center rod 120 in the center of the conveyor belt, or at some other location remote from the conveyor belt edge. The center rod 120 thereby connects to the two edge rods 102' to form one continuous splice rod.

In order to splice together a flat wire conveyor belt from the center, the pickets of the belts are aligned in succession and a first edge rod 102' is inserted from an intermediate opening or interior position of the belt towards a first outside edge of the belt in the direction of arrow B (FIG. 14) through the link openings 114 of the respective rows of pickets 108. When the rod 102' is disposed completely through the pickets, the outer edge j-shaped end (not shown) is hooked or snapped onto the projecting tab 118 on the end 116 of the picket 108, either by hand or through the use of a simple pair of pliers, as described above relative to the first preferred embodiment. The other edge rod 102' is inserted in a similar manner on the opposite side of the conveyor belt and in the opposite direction towards a second outside edge of the belt. The center rod 120 is inserted from the intermediate opening on one side of the belt towards the other intermediate opening on the opposite side of the belt. The j-shaped ends 122, 124 of the center rod 120 each connect with a corresponding j-shaped end of the opposing edge rods 102'. Upon connection of the j-shaped ends, the splice is thereby complete.

Figure 8:
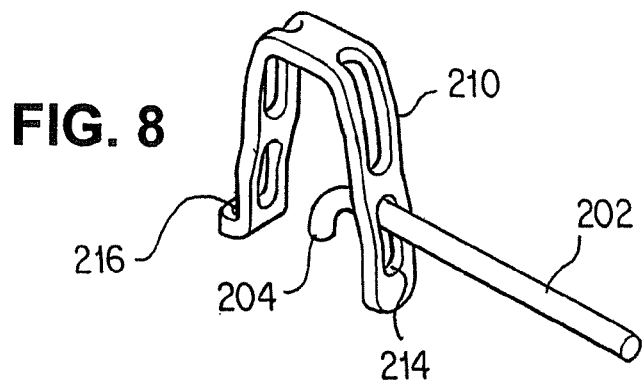
FIG. 8 is a perspective view of a link in a grid type conveyor belt with the connector rod partially installed in accordance with a further preferred embodiment of the invention.
Figure 9:
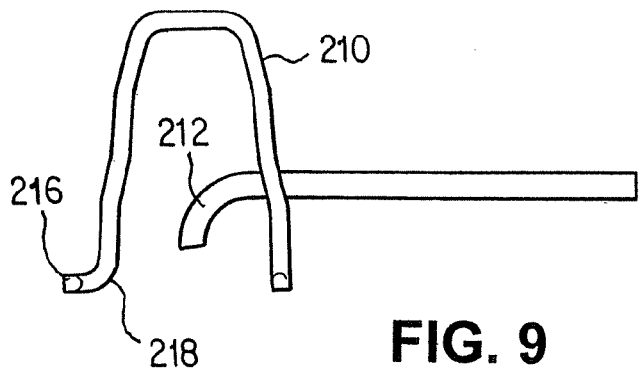
FIG. 9 is an elevational view thereof.

A grid style conveyor belt, such as that described above and disclosed in U.S. Pat. No. 6,354,432, has tension bearing members mounted only on the ends of the connecting rods, and thus has a slightly modified splicing system in accordance with a third embodiment of the present invention. Referring to FIGS. 8 and 9, a grid style conveyor belt includes a plurality of spaced transverse rods 202 slidably interconnected by a row of U-shaped connecting links 210 disposed respectively along each end 204 of the rod. Similar to the previously described first embodiment of the invention, rods 202 include a special connecting "J" rod for splicing together two ends of a conveyor belt. The rods 202 are pre-formed with a "J" shaped hook 212 on each end. Moreover, the links 210 include a pair of longitudinally extending legs including openings 214 proximal each terminal end which define slots sized to allow the J-shape hook 212 on the ends of the rod 202 to pass freely through the links 210. In order to secure the connecting rods 202 after they are inserted through the links, the outermost ends 216 of the outer legs of links 210 are modified to form a hole 218 in an extension of the link for receiving the end of the J-shaped hook 212 on the rod 202 and to be bent around the rod after it inserted into the hole.

Figure 10:
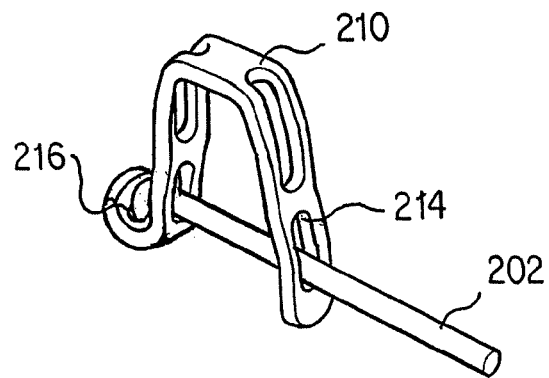
FIG. 10 is a perspective view of a link in a grid type conveyor belt with the connector rod fully installed.
Figure 11:
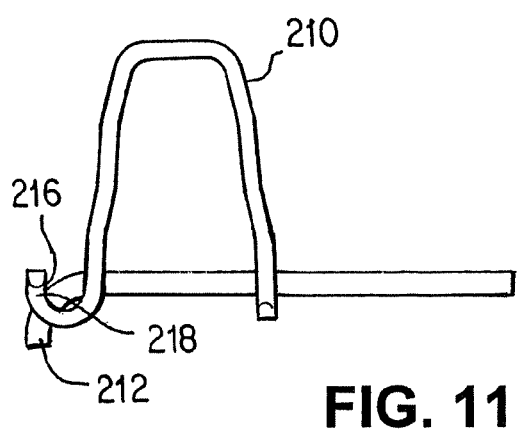
FIG. 11 is an elevational view thereof.

In order to splice together two ends of grid style conveyor belts, the links 210 of the belts are aligned in succession and a splice rod 202 is inserted in the direction of arrow A through the link openings 214 (only one belt being shown in FIGS. 8 and 9). Referring also to FIGS. 10 and 11, when the rod 202 is disposed completely through the links 210, the j-shaped ends 204 are hooked or snapped into the holes 218 on the end 216 of the link 210, generally by hand. Thereafter, the link ends 216 are bent upwards around the end of the rod using of a simple pair of pliers in order to secure the rod. Upon the upward bending of the terminal end of the link, the splice is thereby complete. When it is necessary to take a belt apart, such as to remove a damaged section for example, this process can be easily reversed for removal of the same. The center splice method described above relative to a flat wire conveyor belt can of course also be implemented on a grid style conveyor belt.

While the present invention has been described with respect to particular embodiments of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

We claim:

1. A conveyor belt comprising:
    a plurality of spaced tractive rods;
    a plurality of rows of flat wire wickets transversely disposed with respect to a direction of travel and interconnecting said plurality of spaced tractive rods,
    wherein at least one of said rows of flat wire wickets includes an outer edge link on each end thereof, said outer edge link including a projecting tab on an outer side thereof; and
    wherein at least one of said plurality of rods includes a hooked shaped end on each end thereof, at least one hooked shaped end of said at least one rod engaging the projecting tab on one said outer edge link.

2. The conveyor belt according to claim 1, wherein in said at least one of said rows of flat wire wickets, each of said links defining sad at least one row includes a pair of projecting legs, said legs including an opening sufficiently dimensioned for passage of said hooked shaped of said rod.

3. The conveyor belt according to claim 2, wherein said hooked shaped ends on said rod engage the projecting tab on each said outer edge link on said row.

4. The conveyor belt according to claim 2, wherein said at least one rod comprises a first edge rod, a center splice rod, and a second edge rod.

5. The conveyor belt according to claim 4, wherein said first edge rod and said second edge rod include hooked shaped ends on each end thereof and said center splice rod includes hooked shaped ends on each end thereof.

6. The conveyor belt according to claim 5, wherein one of said ends of said first edge rod engages said projection tab on one of said outer edge links, one of said ends of said second edge rod engages said projection tab on another of said outer edge links, the other end of said first edge rod and the other end of said second edge rod engaging opposing hooked shaped ends of said center splice rod.

7. The conveyor belt according to claim 1, wherein said at least one of said rows of flat wire wickets comprises said plurality of rows of flat wire wickets.

8. A conveyor belt for conveying product in a direction of travel, said conveyor belt comprising:
    a plurality of pivotal transverse rods extending laterally across the belt, said transverse rods having inner and outer ends along inner and outer edges of the belt, said inner and outer ends of said transverse rod having a hooked configuration;
    a plurality of connecting links arranged in at least one longitudinal row along the inner and outer edges of the belt and pivotally interconnecting the inner and outer ends of the transverse rods, respectively, each of said connecting links having a pair of longitudinally extending legs and an opening extending laterally through each said leg such that said hooked configuration of the transverse rods extend through said openings, wherein an outer leg of each said connecting link includes an extension having an opening therein;
    wherein said hooked configuration of said inner and outer ends of said transverse rod are disposed through said openings in said outers legs of said connecting links.

9. The conveyor belt according to claim 8, wherein at least one of said plurality of transverse rods includes a first edge rod, a center splice rod, and a second edge rod.

10. The conveyor belt according to claim 9, wherein said first edge rod includes a hooked configuration on each end, said center splice rod includes a hooked configuration on each end, and said second edge rod includes a hooked configuration on each end.

11. A method of manufacturing a conveyor belt, said method comprising:
    providing a plurality of transverse rods including a hooked shaped end on each end thereof;
    providing a plurality of wickets or links having a first pair of openings extending laterally therethrough and a second pair of openings extending therethrough, said outermost edge wickets or links including a projecting extension;
    arranging the transverse rods through the first and second pair of openings so as to pivotally interconnect the transverse rods in a longitudinally spaced arrangement; and
    wherein said hooked shaped ends of said rods engage the projecting extensions on said outermost wickets or links.

12. The method according to claim 11, wherein said projecting extension on said outermost edge wickets include projecting tabs, said hooked shaped ends of said rods engaging the projecting tabs.

13. The method according to claim 11, wherein said projecting extensions on said outermost edge links include extended link legs having an opening therethrough, said hooked shaped ends of said rods extending through said openings.

14. The method according to claim 11, wherein said rods include a first edge rod, a center splice rod, and a second edge rod, said method further comprising arranging said first edge rod from an intermediate belt position to an outer edge position, arranging said second edge rod from an intermediate belt position to an outer edge position, and joining said first and second edge rods to said center splice rod.

* * * * *